May 6, 1958  E. R. BERGMANN  2,833,389
SHAKER CONVEYOR LOADING DEVICE
Filed Jan. 14, 1955  3 Sheets-Sheet 2

INVENTOR
ERNST R. BERGMANN
BY Murray A. Gleeson
ATTORNEY

May 6, 1958 E. R. BERGMANN 2,833,389
SHAKER CONVEYOR LOADING DEVICE
Filed Jan. 14, 1955 3 Sheets-Sheet 3
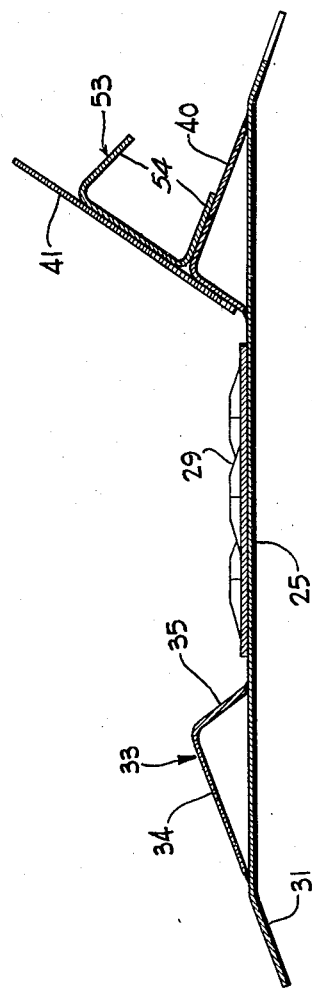
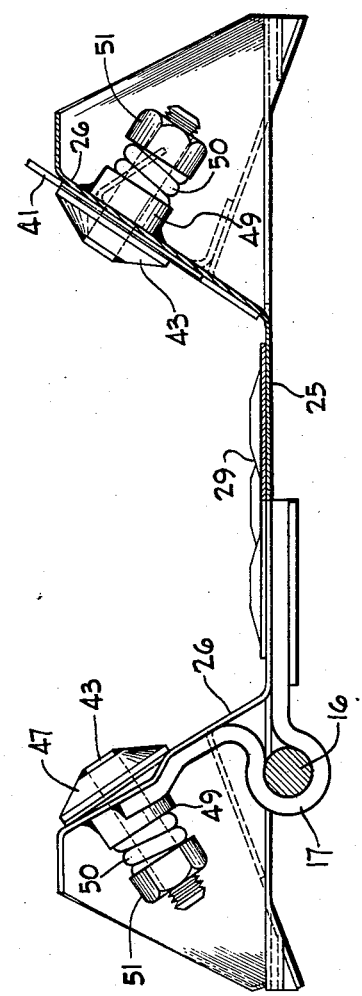
INVENTOR
ERNST R. BERGMANN
By Murray G. Gleeson
ATTORNEY

United States Patent Office 2,833,389
Patented May 6, 1958

2,833,389

SHAKER CONVEYOR LOADING DEVICE

Ernst R. Bergmann, Evergreen Park, Ill., assignor to Goodman Manufacturing Company, Chicago, Ill., a corporation of Illinois Application January 14, 1955, Serial No. 481,753

7 Claims. (Cl. 198—14)

This invention relates to improvements in loading devices for shaker conveyors and more particularly relates to an improved loading pan reciprocably driven by a shaker conveyor pan line and forming a continuation of the end thereof and fed laterally across a coal face, for loading the broken down coal at the face onto the pan line.

An object of my invention is to improve upon loading pans of the character described, by providing a simplified form of loading pan of sufficient strength to withstand the impact of the coal shot down thereon and so arranged as to work under the coal and avoid climbing of the pan upwardly along the loose coal.

A further object of my invention is to provide a simplified and improved relatively flat loading pan for loading onto a shaker conveyor trough line by reciprocable and lateral feeding movement of the loading pan across a coal face, and having a reversible material retaining member extending along the retreating side of the loading pan in either direction of lateral feeding movement thereof.

A still further object of my invention is to provide a simple and improved form of loading pan arranged for reverse operation and to prevent climbing of the pan along the broken down coal being loaded, and readily adaptable to retain material thereon in either direction of lateral feeding movement of the loading pan.

Still another object of my invention is to provide a loading pan particularly adapted to load onto a shaker conveyor trough line upon reciprocable movement of the trough line and pan and lateral feeding movement of the pan across the coal face, having a reversible detachable spill plate for attachment to the retreating side of the loading pan in either direction of lateral feeding movement thereof, for retaining loose material to flow to the outby end of the pan by the reciprocable action of the shaker conveyor.

A still further object of my invention is to provide a simplified form of reversible loading pan having a relatively flat bottom and downwardly inclined agitating and pick up edges extending along each side thereof, with a reversible spill plate positionable to extend along the retreating side of the loading pan in either direction of lateral feeding movement thereof.

A still further object of my invention is to provide a loading pan forming a forward continuation of a shaker conveyor trough line and loading by lateral feeding movement thereof in either direction, as the loading pan is being reciprocated by the trough line, and having angular reinforcing plates extending along each side thereof, one face of which forms a continuation of a downwardly inclined agitating edge thereof and the other face of which forms a retaining means for retaining loose material thereon, together with a detachable spill-plate adapted to rest against and be supported on either one of said reinforcing plates in accordance with the direction of lateral feeding movement of the loading pan.

These and other objects of my invention will appear from time to time as the following specification proceeds and with reference to the accompanying drawings wherein:

Figure 4 is a transverse sectional view taken substantially along line 4—4 of Figure 2; and Figure 5 is a transverse sectional view taken substantially along line 5—5 of Figure 2.

Figure 1:
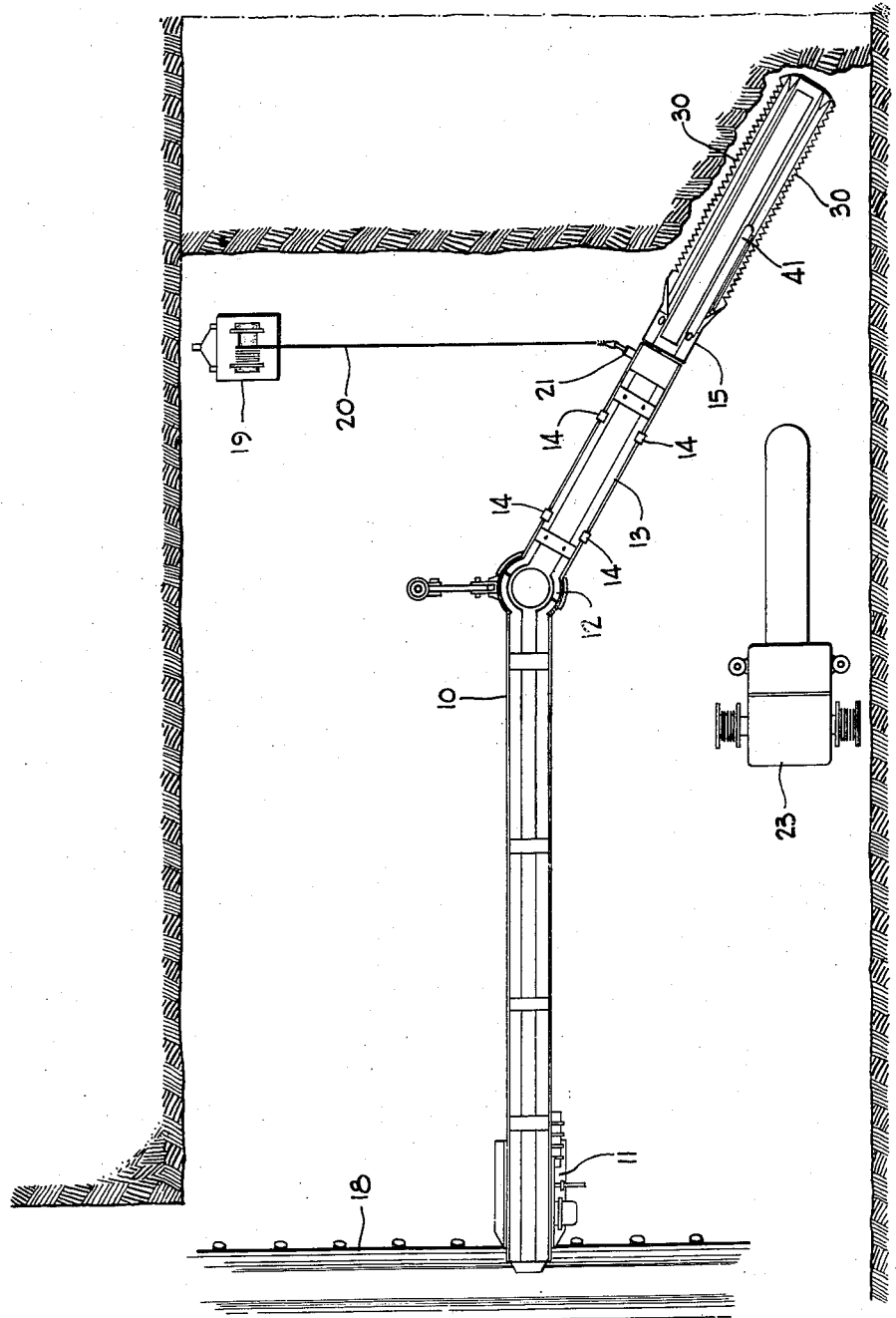
Figure 1 is a diagrammatic view showing a loading pan constructed in accordance with my invention connected to the inby end of a shaker conveyor trough line, and in loading position at the initiation of a loading operation and prior to breaking down of the coal on the pan.
Figure 2:
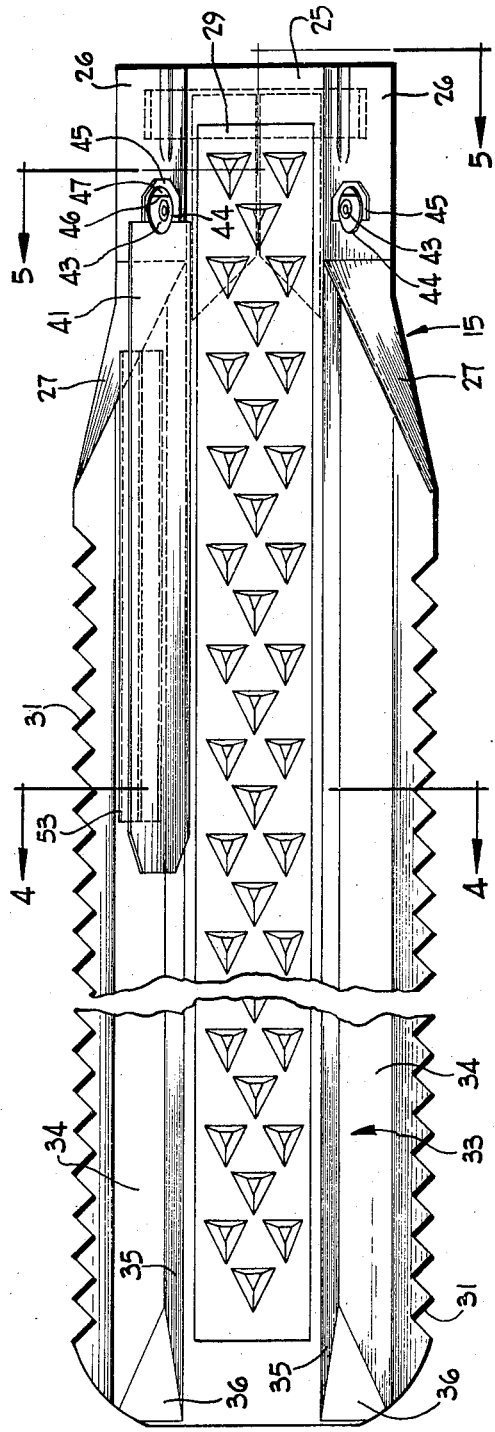
Figure 2 is a top plan view of the loading pan shown in Figure 1.
Figure 3:
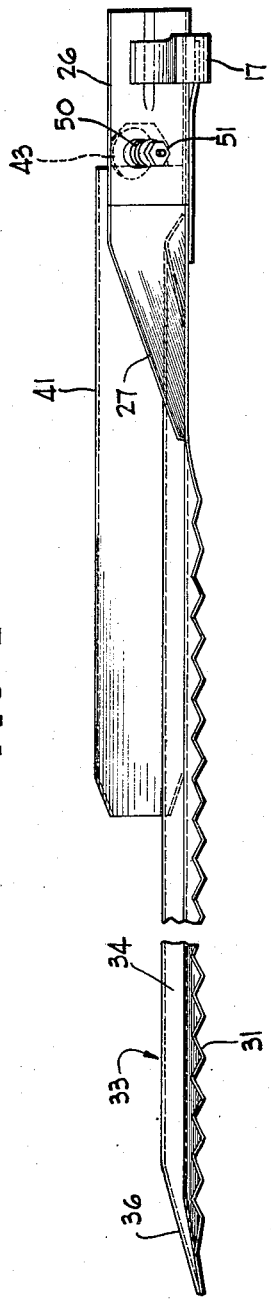
Figure 3 is a view in side elevation of the loading pan shown in Figure 2.

In the embodiment of my invention illustrated in the drawings, I have shown in Figure 1 of the drawings, a shaker conveyor trough or pan line, reciprocably driven at its outby end by a shaker conveyor drive mechanism indicated generally by reference character 11. The drive mechanism and drive connection to the pan line may be of any well known form commonly used to drive shaker conveyor pan or trough lines and is no part of my present invention so need not herein be shown or described further. The pan line 10 has connection at its forward end with a swivel pan or trough 12 having an extensible trough 13 connected to the inby end thereof as is usual with such loading devices. The extensible trough 13 is herein shown as comprising two nested troughs clamped together at their flanges by suitable clamping means, such as C-clamps 14. The forwardmost trough of the extensible trough 13 is connected with a loading pan 15 by means of connecting bolts 16 extending through the usual connecting eyes 17, extending laterally from the bottom portion of the loading pan 15 and from the adjacent end of the inby trough of the extensible trough section 13.

The loading pan 15 is inserted in a kerf undercut by an undercutting machine 23, preferably adjacent the right hand rib of the working place. The shaker conveyor trough line may then be started in operation and the undercut coal may be shot down on the reciprocating loading pan to progress the coal into and along the telescopic trough section 13, swivel 12, and to the outby end of the trough line for loading into a suitable material transporting device, such as, a belt conveyor 18.

After the coal has been shot down and during reciprocable movement of the trough line 10 and the loading pan 15, the loading pan 15 may be fed about the axis of the swivel trough 12 by a winch 19 anchored adjacent the left hand rib of the working place. The winch 19 has a flexible draft device 20 extending therefrom and connected to a connecting ear 21 extending laterally from the forward end portion of the extensible trough 13, for advancing the loading pan from one rib to the other for loading the shot down coal as it advances across the working place.

As the pan line advances across the working place and has cleaned up the coal at the right hand rib, an undercutting machine 23, which has previously undercut the coal face and has been brought back to the right hand rib in the position shown in Figure 1 after the initial cutting operation starts a next succeeding undercutting operation following the loading pan across the face, and undercutting the face for the next succeeding loading and shooting operation as the working place is loaded out.

As the working place has been loaded out, the undercutting machine is again returned to the right hand rib. With the loading pan reciprocably moving, it may again be advanced across the working face about the axis of the swivel trough 12, either by a draft device of the undercutting machine, or by a second winch, like the winch 19, to load the cuttings or bug dust left by the undercutting machine and clean up the working face prior to the initiation of a next succeeding shooting and loading operation.

Referring now in particular to the loading pan 15 and the novel construction thereof, rendering the loading pan capable of withstanding the load of the coal shot down thereon, cleaning the shot down coal from the working place without climbing, and loading as efficiently in one direction as another, the loading pan 15 is shown as having a generally trough-like outby end having a flat bottom 25 extending for the length of the pan. The loading pan also has inclined side walls 26, inclined outwardly from opposite sides thereof and conforming to the inby end of the extensible trough 13. The side walls 26 flare outwardly to the outer margins of the loading pan at their forward end portions in a conventional manner, as indicated by reference character 27 for confining the loose material to progress along the pan into the extensible trough or pan 13.

Between the flared walls 26 and extending along the flat bottom 25 of the loading pan for substantially the length thereof, is a lagged linear plate 29, having lagging thereon in the form of truncated pyramids with the apices thereof facing toward the inby end of the loading pan, and increasing the frictional resistance of the loading pan to the coal or other material being loaded, to more efficiently progress material therealong during reciprocable movement thereof.

Extending in advance of the outwardly flared walls 27 along each side of the loading pan are downwardly inclined agitating and loading edges 31, herein shown as being serrated, for agitating the loose material during lateral movement of the loading pan across the coal face, and progressing the loose shot down material outwardly along the inclined surface of the advance agitating edge onto the lagged liner plate 29. The agitating and loading edges 31 of the loading pan are shown in Figure 4 as coming into engagement with the ground and as reciprocably moving therealong. These agitating edges engaging the ground at angles are thus so inclined as to dig into the loose coal and maintain the loading pan on the ground under the loose shot down coal and to progress the same onto the pan, and thus avoid the climbing of the pan upwardly along the loose coal.

Inwardly of each loading edge 31 and extending forwardly along the top of the loading pan in advance of the flared side walls 27 thereof, are angular reinforcing plates 33, the legs of which face the bottom of the loading pan and are welded or otherwise secured thereto. Each angular reinforcing plate 33 is shown as having one leg 34 forming a continuation of the loading edge 31 of the pan and with said edge forming a loading ramp, and as having an inner leg 35 forming a continuation of the inclined wall 26 and extending along the loading pan and forming a low retaining wall forming a continuation of the flared walls 26 and 27 and extending for substantially the length of the loading pan. The forward end portions of the angular reinforcing plates 33 are beveled, or inclined downwardly to the plane of the bottom 25 of the loading pan, and the cutaway portions thereof are shown as being filled by inclined filler plates 36.

Each angular reinforcing plate 33 thus has an advance leg or face 34, forming a continuation of the inclined loading edge 31 of the loading pan and a ramp for loading loose material onto the loading pan, and has an inner retaining leg or face 35 retaining material onto the loading pan. The angular plates 33 thus form retainers as well as reinforcing members for each side of the loading pan, which form with the top surface of said loading pan, box-like reinforcements therefor.

Detachably mounted on either inclined side wall 26 and extending in advance thereof and along the retaining leg or face 35 of an angular reinforcing plate 33, is a spill plate 41. The spill plate 41 is shown as being a relatively thin plate of a height slightly greater than the height of the inclined side wall 26, and is clamped at its rear end to the inclined side wall 26, by a clamping member 43.

The clamping member 43 is shown as being carried on each side wall 26 and as being in the form of a bolt having an enlarged head 44 lapping the outside of a stop plate 45, and extending in advance thereof. The head 44 is adapted to engage the rear end portion of a spill plate 41 placed along a retaining face 35 in abutting engagement with the stop 45, to clamp the spill plate to an inclined side wall 26 upon tightening of a nut 51 on said bolt. One side of the head of the bolt 43 is cut away, as indicated by reference character 46, and abuts the plane face of a stop 47, welded or otherwise secured to the stop plate 45, to prevent turning movement of the bolt. The bolt 43 extends through the stop plate 45 and inclined wall 26 and through a collar 49, shown as being welded to the outer side of the wall 26 and extending outwardly therefrom. A spring 50 is shown as being interposed between the nut 51 and the collar 49 to exert pressure on the nut 51, and lock the nut to the bolt, as well as to exert pressure on the head of the bolt to clampingly engage the spill plate 41.

The spill plate 41 also has an abutment member or support 53 extending along the outer side thereof. The abutment member 53 is herein shown as being generally U-shaped in cross-section and welded or otherwise secured to the spill plate 41 at its web and having legs 54 extending outwardly from said spill plate and inclined inwardly at the angle of the advance face 34 of an associated angular reinforcing plate 33, when the spill plate is positioned to extend along the inner or retaining face 35 of the angular reinforcing plate 33.

The two legs of the abutment member being inclined inwardly toward each other at the same acute angles with respect to the spill plate 41 thus form a support for said spill plate on either angular reinforcing plate 33 and accommodate the spill plate to retain loose material on the loading pan in either direction of lateral movement thereof by reversal of the spill plate to extend along the desired reinforcing angle or plate.

Thus, when the spill plate is clamped to the right hand inclined side wall 26 by the bolt 43, it is supported for a greater part of its length on the angular reinforcing plate 33 to extend at the angle of the face 35 and form a continuation of the side wall 26. When it is desired to reverse the direction of loading, it is merely necessary to loosen the nut 51 and invert the spill plate 41, placing it on the opposite angular reinforcement plate 33 and clamping the spill plate to extend along the face 35 by a clamping bolt 43 on the opposite inclined side wall 26.

It may be seen from the foregoing that a simplified form of reverse operating loading pan has been provided having a generally flat bottom throughout the length thereof and having a reversible spill plate for mounting to extend along either side of said pan for retaining material to said loading pan in either direction of lateral movement thereof.

It may further be seen that the loading pan with its flat bottom has downwardly inclined agitating edges so arranged as to retain the loading pan to the bottom during reciprocable and lateral feeding movement thereof, so as to avoid climbing of the loading pan upwardly along the material being loaded, and that the advance faces of the angular reinforcement plates form angular continuations of the agitating edges 31 and form in effect ramps for enabling the material being loaded to readily progress upwardly therealong onto the lagging 29, to be retained thereon by the spill plate 41.

It will be understood that variations and modifications of the present invention may be effected without departing from the spirit and scope of the novel concepts thereof as defined in the claims appended hereto.

I claim as my invention:

1. In a shaker conveyor loading device, a longitudinally reciprocable and laterally movable loading pan having a flat bottom and having generally parallel angular reinforcing plates extending along opposite sides thereof and secured to the top of said pan, said angular reinforcing plates having entering angular faces inclined with respect to the bottom of said pan at relatively flat angles with respect thereto and facing the edges of said pan and having steeper angular faces facing inwardly of said pan and forming material retaining means for said pan in either direction of loading movement thereof, and a reversible spill plate extending along the inner edge of the retreating of said reinforcing angles at the angle of the inclined face thereof.

2. In a shaker conveyor loading device, a longitudinally reciprocable and laterally movable loading pan having a flat bottom and downwardly inclined material agitating and penetrating edges extending along each side thereof and spacing the flat bottom of said loading pan above the ground, angular reinforcing and material retaining plates extending along each side of said loading pan and having outer legs forming continuations of said inclined loading edges and inner faces forming material retaining means extending along each side of said loading pan, a reversible spill plate, means for detachably mounting said spill plate to extend along the inner face of one of said material retaining faces, said spill plate having a generally U-shaped support extending along the outer side thereof, the legs of which extend outwardly from said spill plate and are inclined to conform to the planes of the outer faces of said reinforcing plates for supporting said spill plate on either of said plates at the plane of the inner face thereof.

3. In a shaker conveyor loading device, a longitudinally reciprocable and laterally movable loading pan having a flat bottom and downwardly inclined material agitating and penetrating edges extending along each side thereof and spacing the flat bottom of said loading pan above the ground, angular reinforcing and material retaining plates extending along each side of said loading pan and having outer faces forming continuations of said inclined loading edges and inner faces forming material retaining faces extending along each side of said loading pan, a spill plate for detachably mounting on said pan for abutting engagement with an inner material retaining face of one of said angular reinforcing plates and having a generally U-shaped support extending along the opposite side thereof, the legs of which face outwardly and are inclined toward each other to conform to the planes of the entering faces of said angular reinforcing plates, for supporting said spill plate to extend along the inner retaining face of an associated angular reinforcing plate, and a clamp on said pan adapted to have clamping engagement with the rear end of an associated spill plate, one of said clamps being provided at each side of said loading pan to accommodate reversal of said spill plate upon reverse operation of said loading pan.

4. In a shaker conveyor loading device, a longitudinally reciprocable and laterally movable loading pan having a flat bottom, a trough-like rear end portion having inclined side walls generally conforming to the side walls of the troughs of a shaker conveyor trough line, angular reinforcing plates secured to said pan and having inner faces facing the center of said pan of a substantially less vertical height than the height of said inclined side walls and having outer faces inclined at relatively flat angles with respect to the bottom of said pan and forming loading ramps in either direction of lateral movement of said loading pan, and a reversible spill plate detachably carried by said pan for extension along either of said inner faces of said reinforcing plates for retaining material to said pan in either direction of loading thereof.

5. In a shaker conveyor loading device, a longitudinally reciprocable and laterally movable loading pan having a flat bottom and a trough-like rear end portion having inclined side walls extending along said pan for a short portion of the length thereof, said pan having downwardly inclined material agitating and penetrating edges extending in advance of said trough-like rear end portion and along each side of said pan, angular reinforcing plates having outer faces forming loading ramps forming continuations of the material agitating and penetrating edges of said loading pan and having inner faces forming forward continuations of said inclined side walls and of a substantially less vertical height than said side walls and extending along said loading pan for substantially the length thereof, a reversible spill plate, clamping means on each of said inclined side walls adapted to have clamping engagement with the rear end of said spill plate and clamp said spill plate thereto to extend along the inner face of an associated angular reinforcing plate and retain material thereon in either direction of lateral operation of said loading pan, and support means extending outwardly of said spill plate and extending along the outer advance face of an associated angular reinforcing plate and supporting said loading pan thereon.

6. In a shaker conveyor loading device, a longitudinally reciprocable and laterally movable loading pan having a flat bottom and a trough-like rear end portion having inclined side walls extending along said pan for a short portion of the length thereof, said pan having downwardly inclined material agitating and penetrating edges extending in advance of said trough-like rear end portion and along each side of said pan, angular reinforcing plates having outer faces forming loading ramps forming continuations of the material agitating and penetrating edges of said loading pan and having inner faces forming forward continuations of said inclined side walls and of a substantially less vertical height than said side walls and extending along said loading pan for substantially the length thereof, a reversible spill plate, clamping means on each of said inclined side walls adapted to have clamping engagement with the rear end of said spill plate and clamp said spill plate thereto to extend along the inner face of an associated reinforcing plate and retain material thereon in either direction of lateral operation of said loading pan, and support means extending outwardly of said spill plate and extending along the outer advance face of an associated reinforcing plate and supporting said loading pan thereon, and comprising a generally U-shaped support having outwardly extending legs inclined at the angles of the outer faces of said angular reinforcing plates to support said spill plate on either of said reinforcing plates at the angle of inclination of the inner face thereof.

7. In a shaker conveyor loading device, a longitudinally reciprocable and laterally movable loading pan having a flat bottom having downwardly inclined loading edges extending along opposite sides thereof and spacing the flat bottom of said loading pan above the ground and preventing climbing of said pan in loose material, and generally parallel angular reinforcing plates extending along opposite sides of said pan inwardly of said loading edges and being secured to the top of said pan, said angular reinforcing plates having relatively flat entering angular faces facing the loading edges of said pan and conforming to the angles thereof and having steeper angular faces facing inwardly of said pan and forming a reinforcing and material retaining means for said pan in either direction of lateral loading movement thereof.

References Cited in the file of this patent
UNITED STATES PATENTS

| | | |
|---|---|---|
| 1,767,425 | Aurich | June 24, 1930 |
| 2,607,466 | Bebinger | Aug. 19, 1952 |